May 14, 1929.  P. BRENNER  1,713,328
RECEPTACLE
Filed Dec. 31, 1927

Paul Brenner
INVENTOR

BY
ATTORNEY

Patented May 14, 1929.

1,713,328

UNITED STATES PATENT OFFICE.

PAUL BRENNER, OF CHICAGO, ILLINOIS.

RECEPTACLE.

Application filed December 31, 1927. Serial No. 243,998.

This invention relates to new and useful improvements in receptacles and more particularly to food receptacles adapted for use in connection with steam tables and similar articles.

One of the objects of the invention is the provision of a receptacle of this character which is particularly constructed to contain one or more portions of food which may be of the same or different kind.

Another object of the invention is the provision of a receptacle of the above character which is provided with one or more removable division plates whereby the receptacle may be readily divided into different compartments for the reception of small portions of the same food or foods of different kinds.

A further object of the invention is the provision of detachable and adjustable plates for food receptacles whereby the plates can be quickly and readily adjusted and applied to food receptacles of different sizes.

With the above and other objects in view, the invention consists in the novel features of construction, the combination and arrangement of parts hereinafter more fully set forth, pointed out in the claim, and shown in the accompanying drawings, in which Figure 1 is a top plan view of a receptacle, constructed in accordance with my invention.

Figure 1:
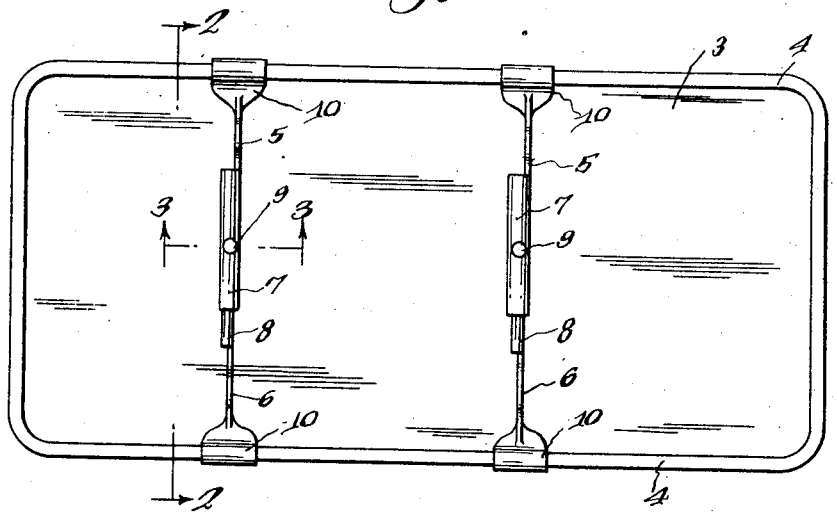
Figure 2:
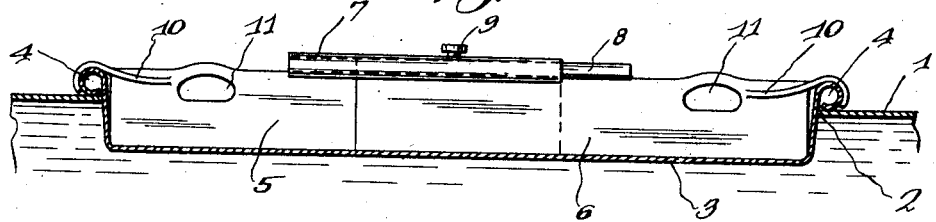
Figure 2 is a longitudinal sectional view.
Figure 3:
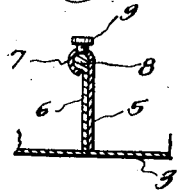
Figure 3 is a cross sectional view on the line 3—3 of Figure 1.

It will be noted in the accompanying drawing, that for the purpose of illustration, I have illustrated a portion of a steam table, as shown at 1, said steam table being of the usual construction and provided with the usual receptacle receiving openings 2, in which the receptacle 3 is positioned. These receptacles are usually of shallow form as illustrated or may be deeper if desired and are preferably of rectangular shape as illustrated. The receptacles used in the present instance are formed around the edges with a rounded bead, as shown at 4, either hollow or solid construction.

The division plates as illustrated are each formed in two sections 5 and 6, the section 5 of each plate being formed at its inner end with an arcuate sleeve part 7 adapted to slidably receive the substantially rounded blade part 8 on each section 6. In order to maintain the sections 5 and 6 in various adjusted positions relative to each other the sleeve part 7 of each section 5 carries a set screw 9 adapted to engage the bead 8 and bind thereagainst. The outer ends of the sections 5 and 6 are formed with lateral wing parts 10, the outer edges of which are curved and engage over the bead 4 on the receptacle. Thus, when the curved edges of the wing parts 10 are engaged with the bead 4, the set screw 9 can be tightened to hold the plates in engagement with the receptacle.

It will be apparent from the foregoing that the division plates can be quickly adjusted to pans or receptacles of different widths and can be readily adjusted along the length of the pan or receptacle, so that a number of the plates can be placed in the same receptacle and spaced apart, as shown in Figure 1. The advantage of the above will be readily apparent as it will be noted that the receptacle is divided into different compartments that may be used for containing different kinds of food or different portions of the same food.

The plates are also extremely useful should it be desired to convey the receptacles from place to place as the sections 5 and 6 are each formed with a hand hold 11 preferably at the inner ends of the wings 10, so that when the plates are securely fastened to the receptacle the receptacles can be readily lifted grasping the plates through the medium of the hand holds 11. It will be apparent that while I have shown and described the use of substantially rectangular receptacles, an oval or other shape may be used as well.

It will be noted that the lower edge of the plates fit closely against the bottom of the receptacle, so as to prevent the separated food portions from intermixing.

While I have shown and described the preferred embodiment of my invention, it will be apparent that various changes and alterations may be carried out without departing from the spirit of the invention or the scope of the appended claim.

I claim as my invention:

In a device of the class described, a body pan formed with a rounded bead portion on its edges, sectional division plates, an arcuate sleeve on one section slidable in the sleeve, a set screw carried by the sleeve to engage the bead, and lateral winged portions at the outer ends of each section having curved outer ends for engagement with the bead portion on the pan.

In witness whereof I have hereunto set my hand.

PAUL BRENNER.